(12) United States Patent
Syrgabekov et al.

(10) Patent No.: US 9,026,844 B2
(45) Date of Patent: May 5, 2015

(54) DISTRIBUTED STORAGE AND COMMUNICATION

(75) Inventors: Iskender Syrgabekov, Almaty (KZ); Yerkin Zadauly, Almaty (KZ); Chokan Laumulin, London (GB)

(73) Assignee: Qando Services Inc., Road Town, Tortola (VG)

( * ) Notice: Subject to any disclaimer, the term of this patent is extended or adjusted under 35 U.S.C. 154(b) by 563 days.

(21) Appl. No.: 13/059,348

(22) PCT Filed: Sep. 1, 2009

(86) PCT No.: PCT/GB2009/002101
§ 371 (c)(1),
(2), (4) Date: Feb. 16, 2011

(87) PCT Pub. No.: WO2010/026366
PCT Pub. Date: Mar. 11, 2010

(65) Prior Publication Data
US 2011/0145638 A1    Jun. 16, 2011

(30) Foreign Application Priority Data

Sep. 2, 2008   (GB) .................................. 0815959.2
Sep. 29, 2008  (GB) .................................. 0817804.8
Oct. 20, 2008  (GB) .................................. 0819211.4

(51) Int. Cl.
*G06F 11/00*     (2006.01)
*H04L 12/707*    (2013.01)
(Continued)

(52) U.S. Cl.
CPC .............. *H04L 45/24* (2013.01); *H04L 1/0041* (2013.01); *H04L 1/04* (2013.01); *G06F 11/1076* (2013.01)

(58) Field of Classification Search
CPC .................................................. H03M 13/1515
USPC ........................................................ 714/6.22
See application file for complete search history.

(56) References Cited

U.S. PATENT DOCUMENTS 5,301,297 A   4/1994   Menon et al.
5,432,787 A   7/1995   Chethik
(Continued)

FOREIGN PATENT DOCUMENTS

EP    0521630 A2   6/1992
EP    0521630 A    1/1993
(Continued)

OTHER PUBLICATIONS

"Storage Virtualization—Definition Why, What, Where, and How?", Nov. 1, 2004, XP002393991, Retrieved from the Internet: URL: http://www.snseurope.com/snslink/magazine/features-full.php?id=2236&magazine=November%202004.
(Continued)

*Primary Examiner* — Amine Riad
(74) *Attorney, Agent, or Firm* — Banner & Witcoff, Ltd.

(57) ABSTRACT

Storing, retrieving, transmitting and receiving data (20) by a) separating the data into a plurality of data subsets (A, B); b) generating parity data (P) from the plurality of data subsets (A, B) such that any one or more of the plurality of data subsets may be recreated from the remaining data subsets and the parity data (P). Steps a and b may be repeated on any one or more of the plurality of data subsets and parity data providing further data subsets and further parity data; and d) storing each of the further data subsets and further parity data in separate storage locations (380) or transmitting the further data subsets and further parity data.

11 Claims, 13 Drawing Sheets

(51) Int. Cl.
*H04L 1/00* (2006.01)
*H04L 1/04* (2006.01)
*G06F 11/10* (2006.01)

(56) References Cited

U.S. PATENT DOCUMENTS

| | | | |
|---|---|---|---|
| 6,158,017 | A | 12/2000 | Han et al. |
| 6,353,895 | B1 | 3/2002 | Stephenson |
| 6,421,803 | B1 | 7/2002 | Persson et al. |
| 7,188,270 | B1 | 3/2007 | Nanda et al. |
| 7,430,701 | B2 * | 9/2008 | Chen .............................. 714/763 |
| 7,577,866 | B1 | 8/2009 | Fan et al. |
| 7,631,143 | B1 | 12/2009 | Niver et al. |
| 8,412,979 | B2 * | 4/2013 | Flynn et al. .................. 714/6.24 |
| 8,458,515 | B1 * | 6/2013 | Saeed .......................... 714/6.22 |
| 8,762,820 | B1 * | 6/2014 | Bonicatto et al. ............. 714/784 |
| 2002/0124139 | A1 | 9/2002 | Baek et al. |
| 2002/0166079 | A1 | 11/2002 | Ulrich et al. |
| 2002/0194526 | A1 | 12/2002 | Ulrich et al. |
| 2003/0007487 | A1 | 1/2003 | Sindhushayana et al. |
| 2004/0044649 | A1 | 3/2004 | Yamato et al. |
| 2004/0177218 | A1 | 9/2004 | Meehan et al. |
| 2005/0033936 | A1 | 2/2005 | Nakano et al. |
| 2005/0229023 | A1 | 10/2005 | Lubbers et al. |
| 2005/0240749 | A1 | 10/2005 | Clemo et al. |
| 2006/0074954 | A1 | 4/2006 | Hartline et al. |
| 2006/0075189 | A1 | 4/2006 | Hood et al. |
| 2006/0107097 | A1 | 5/2006 | Zohar et al. |
| 2007/0050590 | A1 | 3/2007 | Syed et al. |
| 2007/0079083 | A1 | 4/2007 | Gladwin et al. |
| 2008/0235298 | A1 | 9/2008 | Lin et al. |
| 2009/0172244 | A1 | 7/2009 | Wang et al. |
| 2009/0210742 | A1 | 8/2009 | Adarshappanavar et al. |

FOREIGN PATENT DOCUMENTS

| | | |
|---|---|---|
| EP | 1327936 A2 | 7/2003 |
| EP | 1780716 A2 | 5/2007 |
| GB | 2463085 A | 3/2010 |
| GB | 2463087 A | 3/2010 |
| GB | 2463087 B | 7/2013 |
| JP | 08016328 A | 1/1996 |
| JP | 2009017531 A | 1/2009 |
| WO | 0161491 A1 | 2/2001 |
| WO | 0186487 A2 | 11/2001 |
| WO | 0198952 A2 | 12/2001 |
| WO | 02093846 A | 11/2002 |
| WO | 03010626 A2 | 2/2003 |
| WO | 03021869 A1 | 3/2003 |
| WO | 2005052786 A2 | 6/2005 |
| WO | 2007120437 A2 | 10/2007 |
| WO | 2007133791 A2 | 11/2007 |
| WO | 2008054406 A2 | 5/2008 |
| WO | 2008142137 A1 | 11/2008 |
| WO | 2009048726 A1 | 4/2009 |

OTHER PUBLICATIONS

Thomasian A, "Multi-level RAID for very large disk arrays" Performance Evaluation Review, Mar. 2006.
International Search Report, IPO, Dec. 2008.
International Search Report, IPO, Jan. 2009. Application No. GB0817804.8.
International Search Report, IPO, Jan. 2009. Application No. GB0819211.1.
International Search Report, EPO, Oct. 2009.
International Search Report, IPO, Nov. 2009.
International Search Report, IPO, Jun. 2010.
International Search Report, EPO, Sep. 2010.
International Search Report, IPO, Oct. 2010.
International Search Report, IPO, Nov. 2010.
International Search Report, IPO, Jan. 2011.
English Translation of Japanese Office Action off Japanese Patent Application No. 2011-525607, dated Oct. 15, 2013.
Notification of Grant for Patent Serial No. GB2463087, dated Jul. 2, 2013.
Examination Report for GB0819311.4 dated May 23, 2013.
Examination Report for application No. GB0819211.4 mailed Dec. 21, 2011.
Examination Report for application No. GB0815959.2 mailed Dec. 21, 2011.
Examination Report for application No. GB0817804.8 mailed Dec. 21, 2011.
Examination Report for application No. GB0912508.9 dated Jun. 8, 2010.
Search Report for application No. GB0912508.9 dated Jun. 7, 2010.
Examination Report for application No. GB0815959.2 mailed Jan. 11, 2013.
Notification of Grant for application No. GB2463078 mailed Mar. 19, 2013.
Telephone Minutes for application No. GB0815959.2 mailed Mar. 1, 2013.
Examination Report for application No. GB0815959.2 dated Dec. 21, 2011.
Examination Report for application No. GB0817804.8 dated Jan. 11, 2013.
Notification of Grant for application No. GB24630785 dated Mar. 19, 2013.
Telephone minutes for application No. GB0817804.8 dated Mar. 1, 2013.
Examination Report for application No. GB0817804.8 dated Dec. 21, 2011.
Examination Report for application No. GB0819211.4 dated Mar. 18, 2013.
Examination Report for application No. GB0819211.4 dated Jan. 11, 2013.
Examination Report for application No. GB0819211.4 dated Dec. 21, 2011.
Decision of Rejection, dated Jul. 29, 2014, for corresponding Japanese Patent Application Serial No. 2011-525607.

* cited by examiner

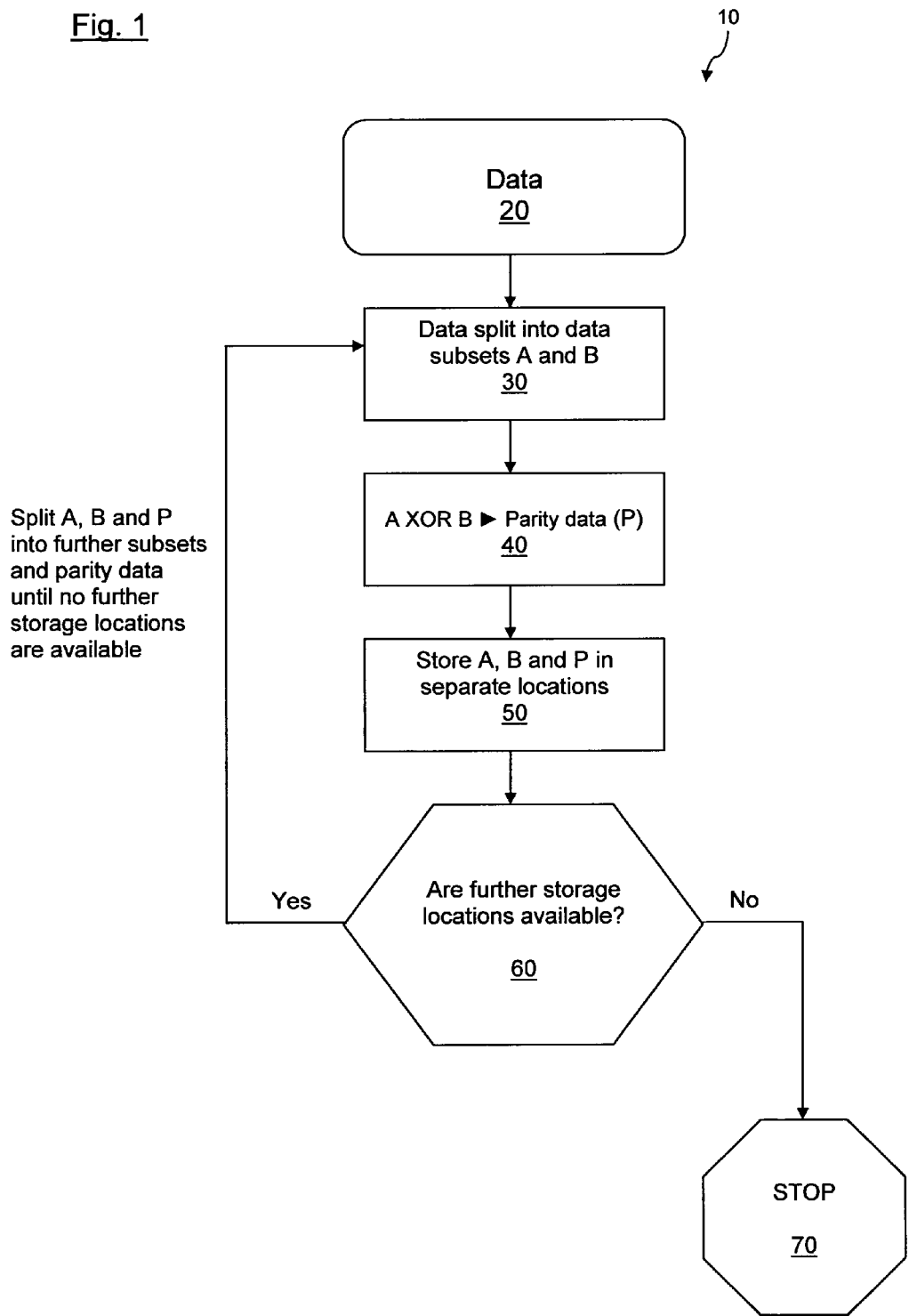

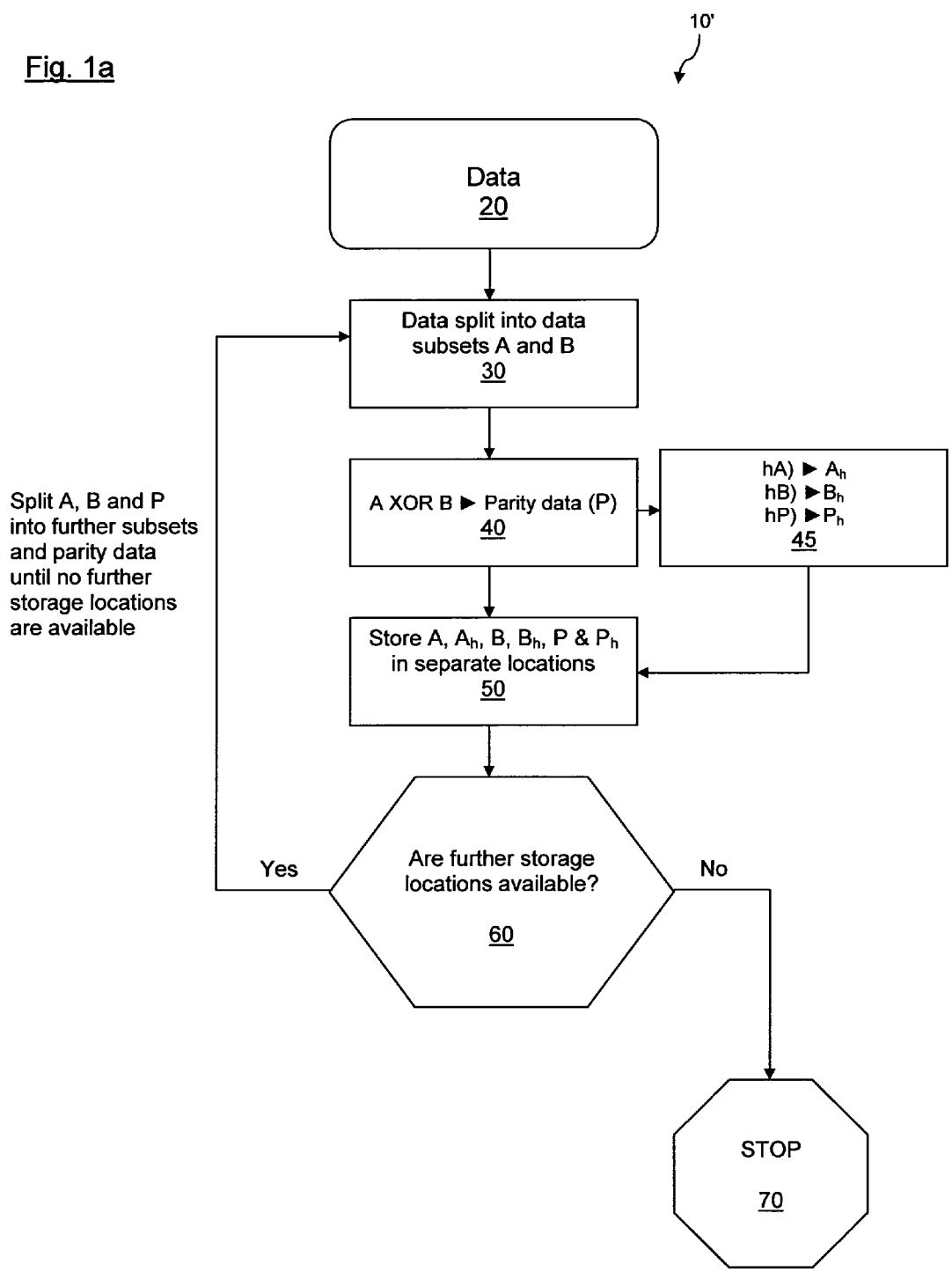

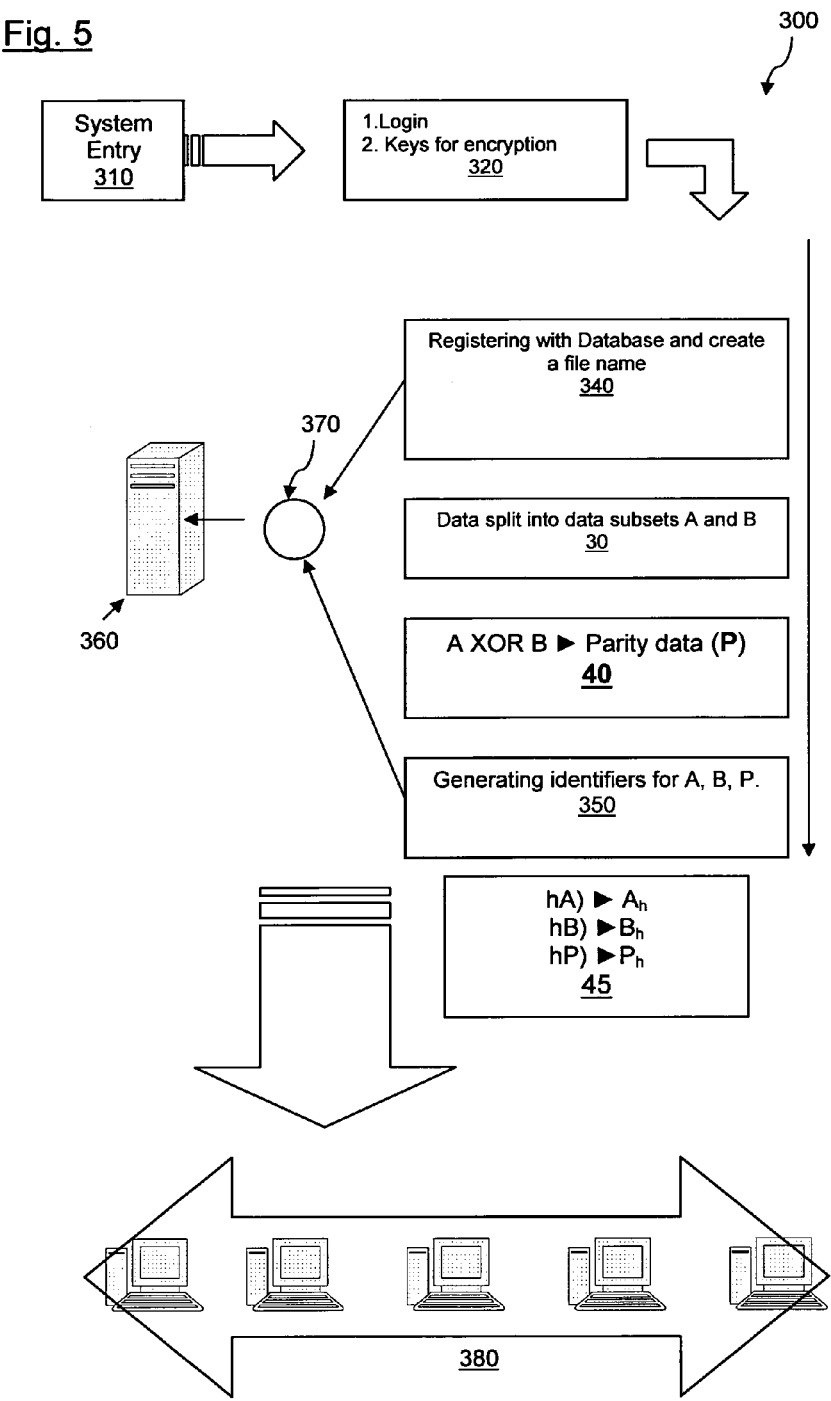

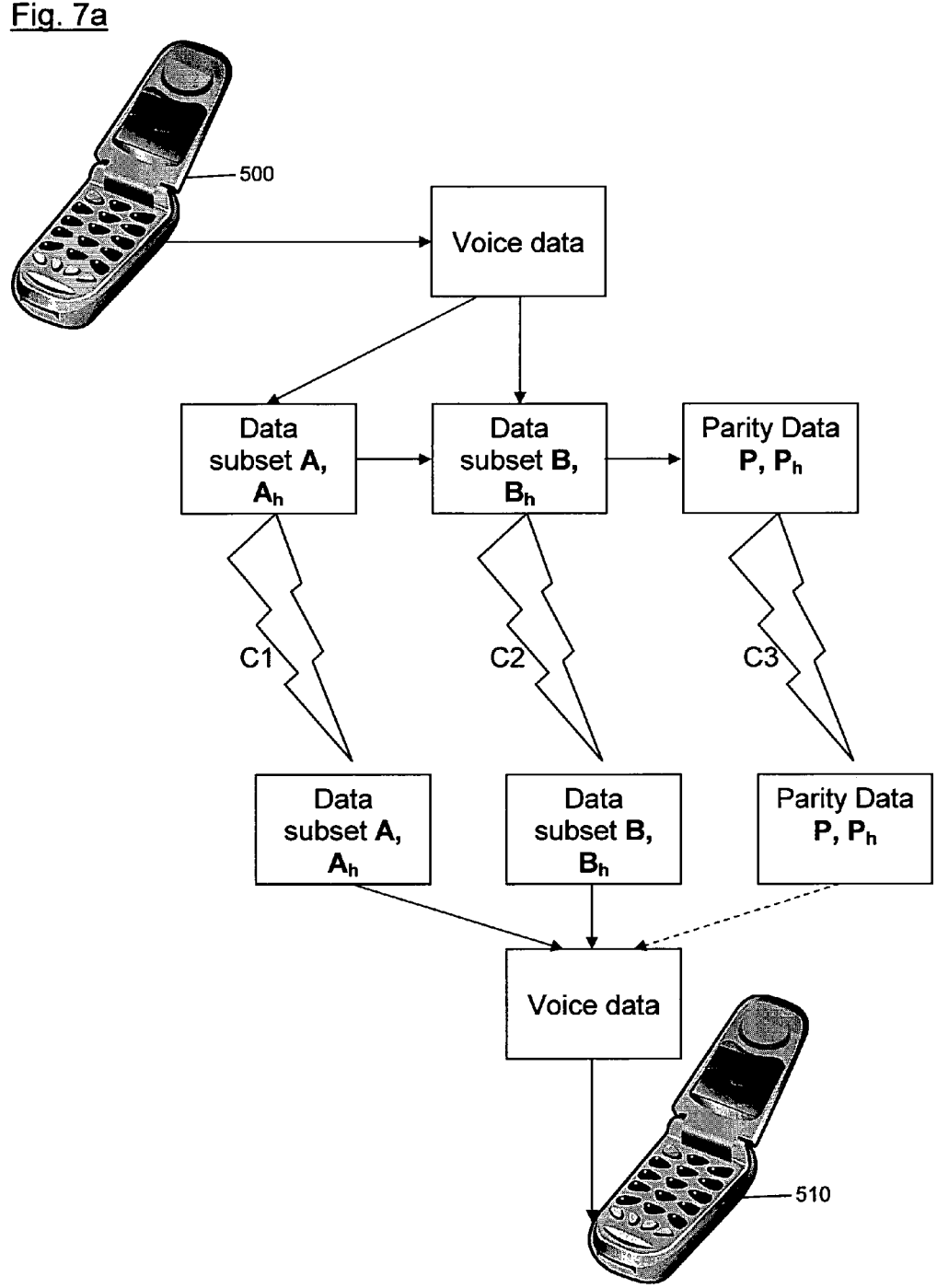

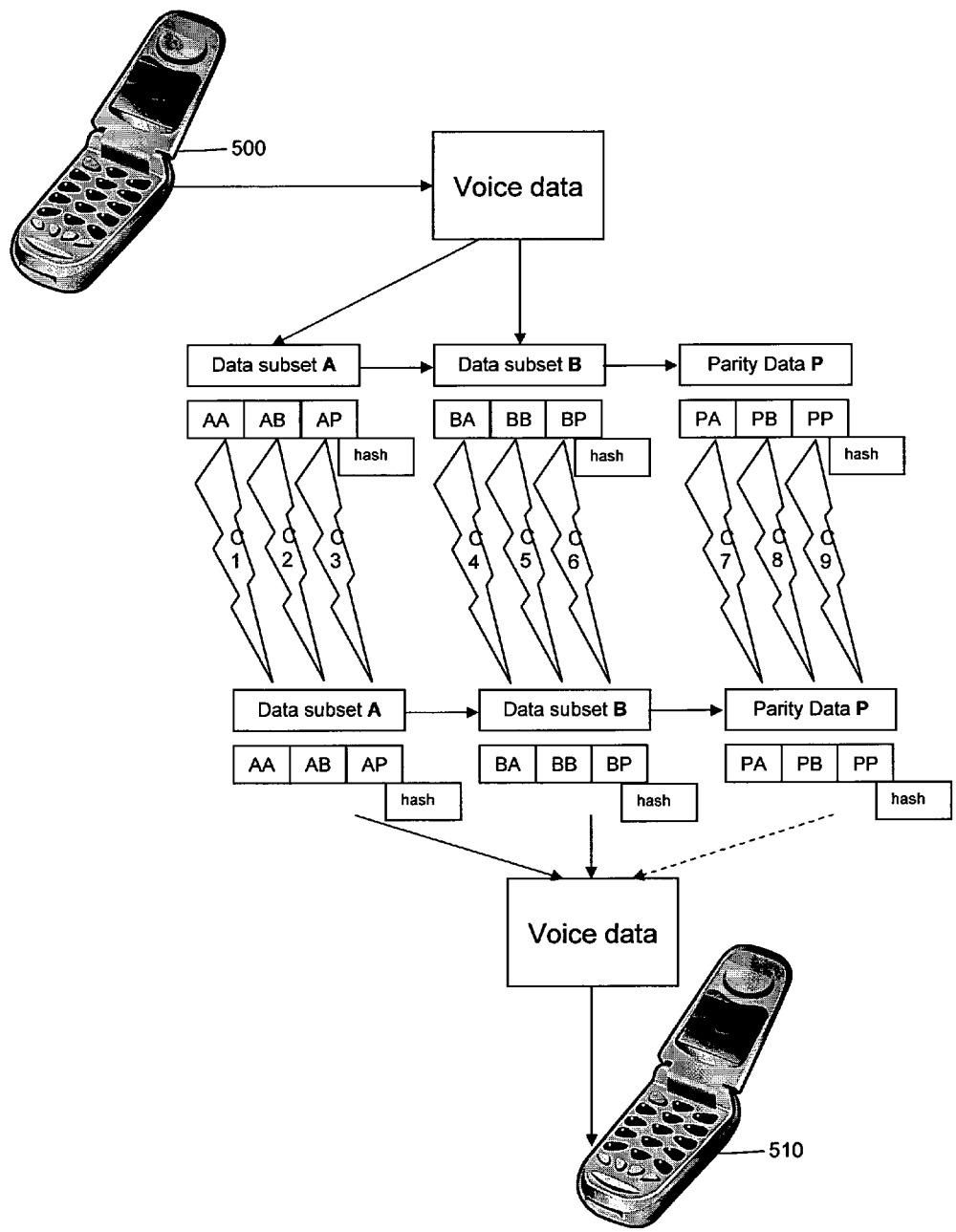

DISTRIBUTED STORAGE AND COMMUNICATION

FIELD OF THE INVENTION

The present invention relates to a method and system for storing and communicating data and in particular for storing data across separate storage locations, and transmitting and receiving data.

BACKGROUND OF THE INVENTION

Data may be stored within a computer system using many different techniques. Should an individual computer system such as a desktop or laptop computer be stolen or lost the data stored on it may also be lost with disastrous effects. Backing up the data on a separate drive may maintain the data but sensitive information may still be lost and made available to third parties. Even where the entire system is not lost or stolen, individual disk drives or other storage devices may fail leading to a loss of data with similar catastrophic effects.

A RAID (redundant array of inexpensive drives) array may be configured to store data under various conditions. RAID arrays use disk mirroring and additional optional parity disks to protect against individual disk failures. However, a RAID array must be configured in advance with a fixed number of disks each having a predetermined capacity. The configuration of RAID arrays cannot be changed dynamically without rebuilding the array and this may result in significant system downtime. For instance, should a RAID array run out of space then additional disks may not be added easily to increase the overall capacity of the array without further downtime. RAID arrays also cannot easily deal with more than two disk failures and separate RAID arrays cannot be combined easily.

Although the disks that make up a RAID array may be located at different parts of a network, configuring multiple disks in this way is difficult and it is not convenient to place the disks at separate locations. Therefore, even though RAID arrays may be resilient to one or two disk failures a catastrophic event such as a fire or flood may result in the destruction of all of the data in a RAID array as disks are usually located near to each other.

Nested level RAID arrays may improve resilience to further failed disks but these systems are complicated, expensive and cannot be expanded without rebuilding the array.

Similarly, portions of transmitted data may also be lost, corrupted or intercepted, especially over noisy or insecure channels.

Furthermore, current data storage and/or transmission methods and devices are prone to corruption and data loss. Even small levels of corruption may affect data quality. This is especially so where the data is used to record high quality audio or visual material as corruption can lead to distortion and loss of quality during playback or from received media.

Therefore, there is required a storage method and system for data that overcomes these problems.

SUMMARY OF THE INVENTION

In accordance with a first aspect of the present invention there is provided a method of storing data comprising the steps of a) separating the data into a plurality of data subsets; b) generating parity data from the plurality of data subsets such that any one or more of the plurality of data subsets may be recreated from the remaining data subsets and the parity data; c) repeating steps a and b on each of the plurality of data subsets and parity data providing further data subsets and further parity data; and d) storing each of the further data subsets and further parity data in separate storage locations. Therefore, the data are separated recursively so that they are distributed as separate data subsets and parity data in several separate storage locations. An original data set is divided into subsets. A parity data set is created from the subsets. The parity data set provides a mechanism for recreating any of the subsets should they be lost or corrupted. The subsets and parity data may contribute to recreating the original data set should this be required. If only parity data subsets are lost then no further processing is required and the original data remains. If no subsets are lost then again, no further processing is required. The process continues with any of the subsets and parity data sets being divided again in a similar way and further parity data being generated. This forms a cascade of data subsets that may be brought back together to form the original data. If any subsets of data are lost then they may be recreated from the remaining subsets and parity data at that particular level in the cascade of data. Therefore, the cascade may grow dynamically and does not need to be defined in advance. Each subset of data or parity data may be stored separately, for instance in neighbouring sections on a disk drive or on separate servers in different organisations or territories. Also, the actual storage locations may be of different sizes or types and so this provides further flexibility to the storage system.

The locations of each data subset and parity data may be recorded so that the original data set may be recreated. Therefore, the location information may be used to restrict access to the original data as access to individual data subsets may not provide a third party access the original data without the remaining subsets.

Each of the plurality of data subsets and parity data may be stored on a separate storage location to the other data subsets and parity data. However, more than one data subset or parity data may be stored on a single storage location especially if the number of storage locations available is limited.

Preferably, each of the further data subsets and further parity data may be stored in separate physical devices.

Preferably, step c) may be repeated for each of the plurality of data subsets and parity data. This distributes and cascades the data more effectively and so improves resilience to data loss and also interception.

Optionally, the method may further comprise the steps of providing additional storage locations and repeating steps a and b on any of the further data subsets or parity data stored in the separate storage locations as the additional storage locations are provided. This allows a dynamic growth of the data cascade and allows the storage capacity to be increased without rebuilding the entire system.

Advantageously, the data are separated byte-wise. However, other separation methods may be used such as bitwise or by different lengths of bits. The data subsets may also be of different sizes.

Optionally, the data are separated into two data subsets.

Optionally, the data are separated according to their odd or even status.

Preferably, the parity data are generated by performing a logical function on the plurality of data subsets. The logical function may be chosen to reduce processing requirements. Parity data generation is not limited to a logical function. For instance, data duplication may also be used.

Preferably, the logical function may be an exclusive OR. This function (XOR) requires a particularly low processing overhead and so improves efficiency. Furthermore, such a function may be carried out using straightforward hardware.

Optionally, the method further comprises the step of encrypting the data. This provides enhanced security and/or privacy.

Optionally, the separate storage locations are selected from the group consisting of hard disk drive, optical disk, FLASH RAM, web server, FTP server and network file server. Other storage mediums may be used and are not limited to read/write locations. The method may be independent of the specific type of storage used. Many other storage types and locations may be used.

Advantageously, the data are web pages or individual files. Web pages or web sites may then be distributed or accessed more securely and reduce eavesdropping or other forms of surveillance. For instance, it may not be possible to generate or recover the original data from individual subsets of data. A minimum quantity of data subsets may be required. Even with access to all subsets of data it may be possible to restrict the ability to recover the original data, for instance by using encryption or requiring details of how the original subsets of data were separated and created.

Optionally, the method, further comprises the step of c1) applying a function to any one or more of the data subsets and parity data to generate one or more associated authentication codes.

Preferably, the function may be a hash function.

Optionally, the hash function may be selected from the group consisting of: checksums, check digits, fingerprints, randomizing functions, error correcting codes, and cryptographic hash functions.

Optionally, the authentication codes may be stored with the further data subsets and/or further parity data.

Optionally, the authentication codes may be stored as header information.

In accordance with a second aspect of the present invention there is provided a method of retrieving data stored in separate storage locations comprising the steps of: a) recovering subsets of data and parity data from the separate storage locations; b) recreating any missing subsets of data from the recovered subsets of data and parity data to form recreated subsets of data; c) combining the subsets of data and any recreated subsets of data to form a plurality of consolidated data sets, wherein the plurality of consolidated data sets include further subsets of data and further parity data; and d) recreating any missing further subsets of data from the further subsets of data and further parity data to form recreated further subsets of data; and e) combining the further subsets of data and any recreated further subsets of data to form an original set of data. Subsets of data are combined and then recombined until the original data set is recovered.

Advantageously, the subsets of data and parity data may be each recovered from separate physical devices. Therefore, each data subset may have their own individual storage location remote from the other, further enhancing security and data reliability.

Optionally, the original data may be encrypted and the method further comprises the step of: f) decrypting the original data.

Preferably, the method may further comprise the step of receiving location information of the separate storage locations. This allows easier access and the location information may be further used to restrict access.

Preferably, the separate storage locations are one or more selected from the group consisting of hard disk drive, optical disk, FLASH RAM, web server, FTP server and network file server.

Advantageously, the separate storage locations may be accessible over a network. The network may be internal or external and may for example be the Internet.

Optionally, the method may further comprise the steps of: recovering authentication codes associated with one or more of the subsets of data and parity data; authenticating one or more of the subsets of data and parity data using the associated authentication codes; and recreating any subsets of data that fail authentication from the recovered subsets of data and parity data to form recreated subsets of data.

Optionally, the authentication codes may be hash codes and the authentication step may comprise applying a hash function to the subsets of data and/or parity data to generate a comparison hash code and comparing this comparison hash code with the authentication codes associated with the data subsets and/or parity data.

In accordance with a third aspect of the present invention there is provided apparatus for storing data comprising a processor arranged to: a) separate the data into a plurality of data subsets; b) generate parity data from the plurality of data subsets such that any one or more of the plurality of data subsets may be recreated from the remaining data subsets and the parity data; c) execute a and b on each of the plurality of data subsets and parity data providing further data subsets and further parity data; and d) store each of the further data subsets and further parity data in separate storage locations.

Optionally, the processor may be further arranged to apply a function to any one or more of the data subsets and parity data to generate one or more associated authentication codes, and further wherein the further data subsets and further parity data may be stored with their associated authentication codes.

In accordance with a fourth aspect of the present invention there is provided apparatus for retrieving data stored in separate storage locations comprising a processor arranged to: a) recover subsets of data and parity data from the separate storage locations; b) recreate any missing subsets of data from the recovered subsets of data and parity data to form recreated subsets of data; c) combine the subsets of data and any recreated subsets of data to form a plurality of consolidated data sets, wherein the plurality of consolidated data sets include further subsets of data and further parity data; and d) recreate any missing further subsets of data from the further subsets of data and further parity data to form recreated further subsets of data; and e) combine the further subsets of data and any recreated further subsets of data to form an original set of data.

Optionally, the processor may be further arranged to recover authentication codes associated with the one or more of the subsets of data and parity data, authenticate one or more of the subsets of data and parity data using the associated authentication codes, and recreate any subsets of data that fail authentication from the recovered subsets of data and parity data to form recreated subsets of data.

In accordance with a fifth aspect of the present invention there is provided a data storage medium for storing a data file, containing data subsets, parity data and authentication codes, wherein the data subsets are combinable to produce further data subsets and the further data subsets are combinable to produce the data file, the authentication codes provide authentication of the data subsets, and further wherein the parity data are combinable with the data subsets to regenerate missing data subsets or data subsets which fail authentication.

Optionally, the storage medium may be selected from the group consisting of: compact disc, DVD, hard drive, solid state drive, FLASH memory and digital tape.

Optionally, the data file may be selected from the group consisting of: multimedia, audio, video, MPEG, MP3, music, database and binary file.

In accordance with a sixth aspect of the present invention there is provided a method of transmitting data comprising the steps of: a) separating the data to be transmitted into a plurality of data subsets; b) generating parity data from the plurality of data subsets such that any one or more of the plurality of data subsets may be recreated from the remaining data subsets and the parity data; and c) transmitting the plurality of data subsets and parity data. This allows data to be transmitted more securely and more reliably as lost data may be recreated. Furthermore, as data is generated any communication channel used may be more fully utilised either reducing error rate or allowing a lower power to be used maintaining a similar available data rate.

Optionally, the transmitting step may further comprise the steps of: i) repeating steps a and b on any one or more of the plurality of data subsets and parity data providing further data subsets and further parity data; and ii) transmitting the further data subsets and further parity data. This provides increased reliability and security.

Optionally, any or all of the data subsets and further parity data are transmitted by different transmission means.

Advantageously, the different, transmission means may be one or more selected from the group consisting of: wire, radio wave, internet protocol and mobile communication.

Preferably, any or all of the data subsets are transmitted on different channels.

Advantageously, the channels may be mobile communication channels. Therefore, this may be implemented in mobile telephones to increase security and reliability of communication.

Optionally, the different channels are different radio frequencies.

Preferably, the choice of different channels is predetermined. This allows a receiver to be able to receiver the data successfully or more conveniently.

Optionally, the method may further comprise the step of transmitting the choice of different channels.

Preferably, the choice may be transmitted as a code. This may be user selectable or automatic. The code may be known to both transmitter and receiver or transmitted securely between them.

Optionally, the method may further comprise the step of encrypting the data. This adds to security. The code may instead or additionally be encrypted.

In accordance with a seventh aspect of the present invention there is provided a method of receiving data comprising the steps of: a) receiving subsets of data and parity data; b) recreating any missing subsets of data from the received subsets of data and parity data to form recreated subsets of data; c) combining the subsets of data and any recreated subsets of data.

Optionally, the recreated subsets of data form a plurality of consolidated data sets, and further wherein the plurality of consolidated data sets include further subsets of data and further parity data, and the combining step further comprises the steps of: d) recreating any missing further subsets of data from the further subsets of data and further parity data to form recreated further subsets of data; and e) combining the further subsets of data and any recreated further subsets of data to form an original set of data.

Optionally, the received data may be encrypted and the method further comprises the step of: f) decrypting the original data.

Advantageously, the receiving step may further comprise receiving any or all of the subsets of data and parity data from different channels.

Preferably, the different channels may be different radio frequencies.

Advantageously, the different channels may be different cellular radio channels.

Optionally, the method may further comprise the step of receiving channel information including details of which channels contain which data subsets and parity data.

Advantageously, the combining step may further comprise combining the subsets of data and any recreated subsets of data based on the received channel information.

Optionally, the channels carrying any or all of the data subsets and parity data vary during reception. This channel hopping makes it more difficult for an unauthorised recipient to decode the original data or listen in to a voice call.

Preferably, the data may be selected from the group consisting of: audio, mobile telephone, packet data, video, real time duplex data and Internet data. Additionally, this method is suitable for other data types.

According to a eighth aspect of the present invention there is provided apparatus for transmitting data comprising a processor arranged to: a) separate the data to be transmitted into a plurality of data subsets; b) generate parity data from the plurality of data subsets such that any one or more of the plurality of data subsets may be recreated from the remaining data subsets and the parity data; and c) transmit the plurality of data subsets and parity data. The processor may have processing logic stored as hardware or software.

Advantageously, the processor may be further arranged to transmit by: i) repeating a and b on any one or more of the plurality of data subsets and parity data providing further data subsets and further parity data; and ii) transmit the further data subsets and further parity data.

According to a ninth aspect of the present invention there is provided apparatus for receiving data comprising a processor arranged to: a) receive subsets of data and parity data; b) recreate any missing subsets of data from the received subsets of data and parity data to form recreated subsets of data; c) combine the subsets of data and any recreated subsets of data.

Advantageously, the recreated subsets of data form a plurality of consolidated data sets, and further wherein the plurality of consolidated data sets include further subsets of data and further parity data, and the processor is further arranged to combine the subsets of data by: d) recreating any missing further subsets of data from the further subsets of data and further parity data to form recreated further subsets of data; and e) combine the further subsets of data and any recreated further subsets of data to form an original set of data. In other words, the data may be cascaded to form further subsets and further parity data. The original data may be regenerated by reversing the cascade process generating any missing data subsets from parity data and the successfully received data.

According to a tenth aspect of the present invention there is provided a mobile handset comprising the previously described apparatus, i.e. a transmitter and/or a receiver.

Optionally, the data described above, i.e. the original data, transmitted data, voice data or data to be secured and stored, may be difference data relative to a reference data file and the method may further comprise the step of comparing the original data with the reference data file to obtain the difference data. This allows data to be stored or transmitted securely without requiring underlying data to leave a restricted or protected environment. This optional feature may be implemented in the methods or apparatus described above.

When the difference or delta data are retrieved from storage locations or received from a transmitter, in the form of combined subsets of data (or regenerated subsets where particular subsets have been lost, corrupted or are otherwise unavailable or fail authorisation), the processor may be further arranged or the method may include the step of applying the difference data to the reference data file to obtain underlying data.

The methods may be implemented in computer software running on a computing device, for instance. The software may be stored on media or transmitted as a signal. For example, the computing device or devices may be a desktop personal computer or server computer running a suitable operating system such as Windows®, Apple OS X or UNIX based systems. An example computing device may include a hard drive or other storage medium, input devices such as a keyboard and mouse and a display screen.

Optionally, the method steps may be carried out on a single machine, computer or group of computers connected to a network such as an intranet or the Internet.

BRIEF DESCRIPTION OF THE FIGURES

The present invention may be put into practice in a number of ways and embodiments will now be described by way of example only and with reference to the accompanying drawings, in which:

FIG. 1 shows a flowchart of a method for storing data, according to an aspect of the present invention given by way of example only;

FIG. 1a shows a flowchart of an alternative method similar to that shown in FIG. 1;

FIG. 2a shows a schematic diagram of the data stored using the method of FIG. 1a;

FIG. 3a shows a schematic diagram of data stored according to the method of FIG. 1a;

FIG. 4a shows a schematic diagram of the data distributed as cluster stored following the method of FIG. 1a;

FIG. 5 shows a flow diagram of a method of storing data according to a further aspect of the present invention, given by way of example only;

FIG. 7a shows a schematic diagram of a communication system according to a further aspect of the present invention, given by way of example only;

FIG. 8a shows a schematic diagram of a communication system according to a further aspect of the present invention, given by way of example only.

Figure 2:
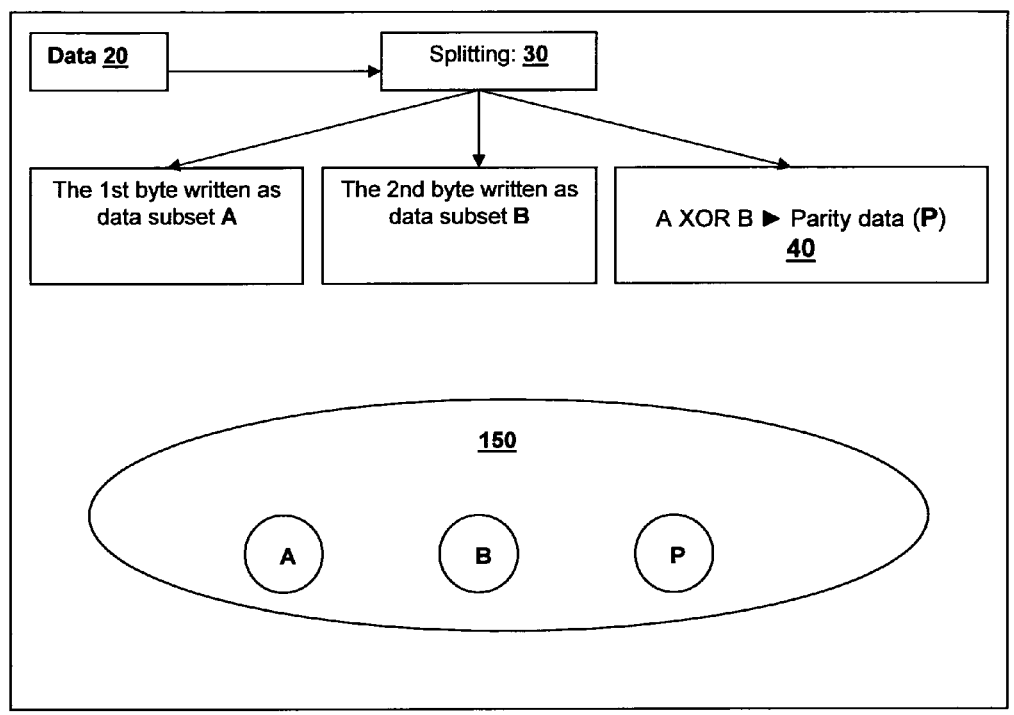
FIG. 2 shows a schematic diagram of the data stored using the method of FIG. 1.

It should be noted that the figures are illustrated for simplicity and are not necessarily drawn to scale.

DETAILED DESCRIPTION OF THE PREFERRED EMBODIMENTS

Data to be stored may be in the form of a binary file, for instance. The data may be divided into subsets of data. Parity data may be generated from the subsets of data in such a way that if one or more of the data subsets is destroyed or lost that missing subset may be recreated from the remaining subsets and parity data. Parity or control data is generated from the original data for the purpose of error checking or to enable lost data to be regenerated. However, the parity data does not contain any additional information over that contained by the original data. There are several logical operations that may achieve the generation of such parity data. For instance, applying an exclusive or (XOR) to two binary numbers results in a third binary number, which is the parity number. Should either of the original two binary numbers be lost then it may be recovered by simply performing an XOR between the remaining original number and the parity number. For a more detailed description of a calculation of parity data see http://www.pcguide.com/ref/hdd/perf/raid/concepts/genParity-c.html. Once the parity data has been calculated all of the data subsets and parity data may be stored in separate or remote file locations.

However, each of the data subsets or parity data may be separated into further subsets and further parity data may be generated in order to utilise any additional storage locations. In this way a cascade of data subsets may be created until all available storage locations are utilised or a predetermined limit in the number of locations is reached. The data may be recovered using a reverse process with any missing data subsets being regenerated or recreated from the remaining data subsets and parity data using a suitable regeneration calculation or algorithm. The reading process continues until the single original data is recovered.

In one alternative embodiment, authentication or hash codes may be associated with any of the data subsets and/or parity data for use in confirming the authenticity of the data subsets. Authentic data subsets will not have changed or altered deliberately or accidentally following creation of the data subset. This alternative embodiment or its variations are described as authentication embodiments throughout the text.

FIG. 1 shows a flow diagram of an example method 10 for storing data. The original data 20 is split into data subsets A and B in step 30. The data may be split into two equal parts, so that the subsets A and B are of equal size. Zero padding may be used to ensure equal sized subsets A and B. For example, additional zero bytes (or groups of bits) may be added to the end of subsets A and B before the parity data P is generated. After the data 20 has been split into subsets A and B an exclusive OR operation may be carried out on subsets A and B, at step 40, to generate parity data set P. Alternatively, the parity data P may be generated during the splitting or separation step 30.

In the authentication embodiment method shown as a flow diagram 10' in FIG. 1a, after the generation of data subsets A and B, a hashing function h(n) may be applied at step 45. This hashing function generates hash codes h(A) and h(B). The parity data P may also be hashed to generate hash code h(P). The hashing function may be chosen such that the computational power to perform it or compare resultant hash codes is acceptable or within system limitations. The hash function may be applied to subsets A, B and/or parity data P. A reduction in computer overhead may be made by not hashing one or more of the data subsets or parity data in any combination.

The resultant two data subsets A and B and parity data set P (and optional hash codes) may be stored at step 50. The subsets A and B and parity data may be stored in memory or a hard drive for instance. The method 10 may loop at this point. It is determined whether or not there are any further storage locations available or required at step 60. If there are then the method loops back to step 30 where any or each of the data subsets A, B and/or parity data P are further split into new subsets and a further parity data set. The loop continues with each data subset and parity data being for divided and generated until there are no further storage locations available and the method stops at step 70.

In the authentication embodiments, the hash or authentication codes may be stored together with the data subsets A and B and/or the parity data P, stored as header information or stored separately, perhaps in a dedicated hash library or store.

Where additional storage locations are available and further looping of the method occurs, the hash generation may be optionally differed until the lowest level of split data is reached, i.e. only the data which is actually stored rather than any intermediate data subsets. This provides improved efficiency.

In the non-authentication embodiment, the first iteration of the loop of method 10 results in three separate data files (A, B and P); two full iterations results in nine separate data files and three full iterations results in 27 separate data files. Alternatively, it may not be necessary to split each data subset to the same degree. Where there are many storage locations available the subsets may be split create further subsets until subsets of a predetermined minimum size are created. Further utilisation of storage locations may then alternatively involve simple duplication in order to improve resilience to data loss.

For the authentication embodiment shown in FIG. 1a, three separate data files are generated (A, B and P) and three hash codes are generated ($A_h$, $B_h$ and $P_h$).

With the data 20 being split into nine separate locations four of those datasets may be lost or corrupted (detectable via optional hash code comparison) leaving it still possible to always recreate the original data set 20. More than four may even be lost and still result in accurate regeneration of the original data set 20 but this cannot be guaranteed as it depends on which particular sets are lost.

The hash codes shown in FIG. 1a, may be generated for all stored data files and/or parity data to ensure that corruption or adjustment of the data has not occurred.

FIG. 2 shows a schematic diagram of the data resulting from a single iteration of the method shown in FIG. 1. Like method steps have the same reference numerals. The original data set 20 is split byte-wise to generate data subset A and data subset B (i.e. block size of one byte). The exclusive OR operation generates parity data P. Where there are three separate storage locations available the method 10 would stop at this stage resulting in a data cluster 150 having three distributed discrete data subsets A, B and P.

Figure 2A:
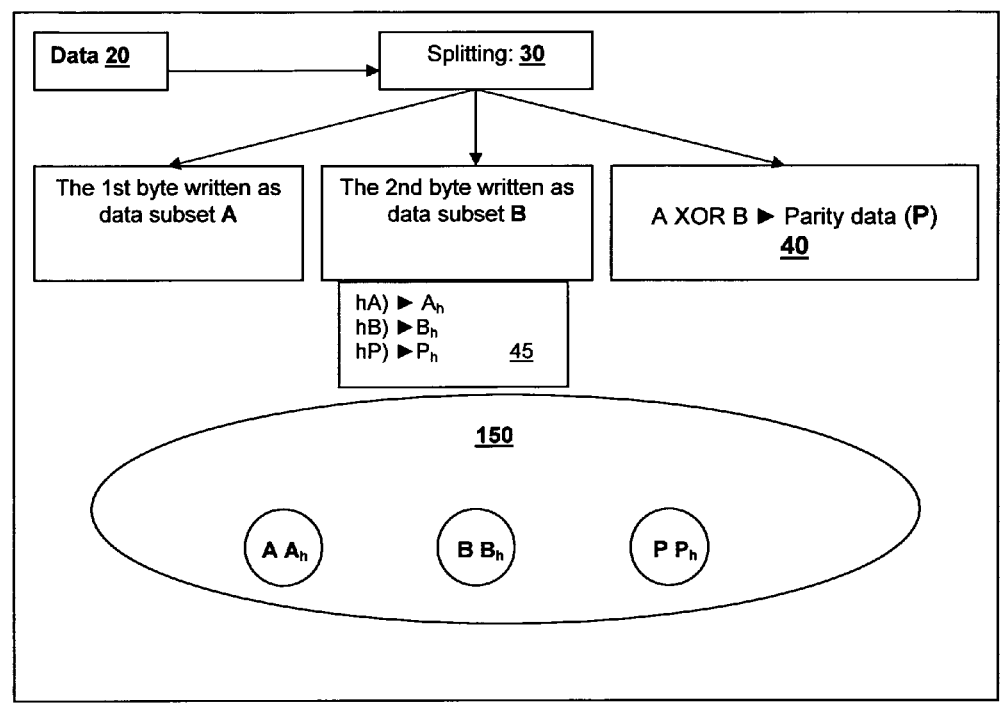

FIG. 2a shows an alternative schematic diagram of the data including the hash codes.

Figure 3:
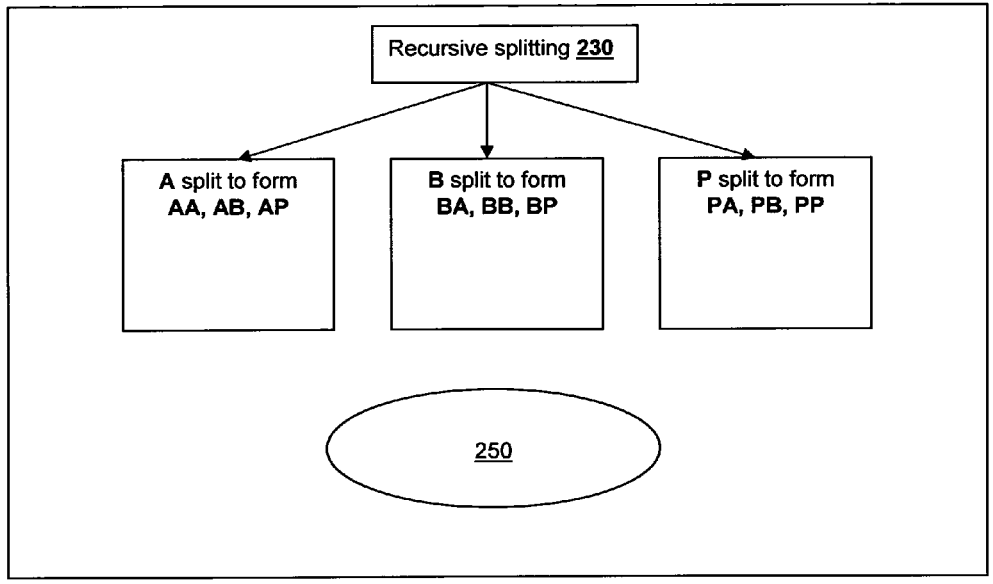
FIG. 3 shows a schematic diagram of data stored according to the method of FIG. 1.

FIG. 3 shows the result of a further iteration of steps 30, 40 and 50 of method 10. In this case, nine separate storage locations are available and so each of the three data subsets A, B and P may be further split into three further data subsets each.

Figure 3A:
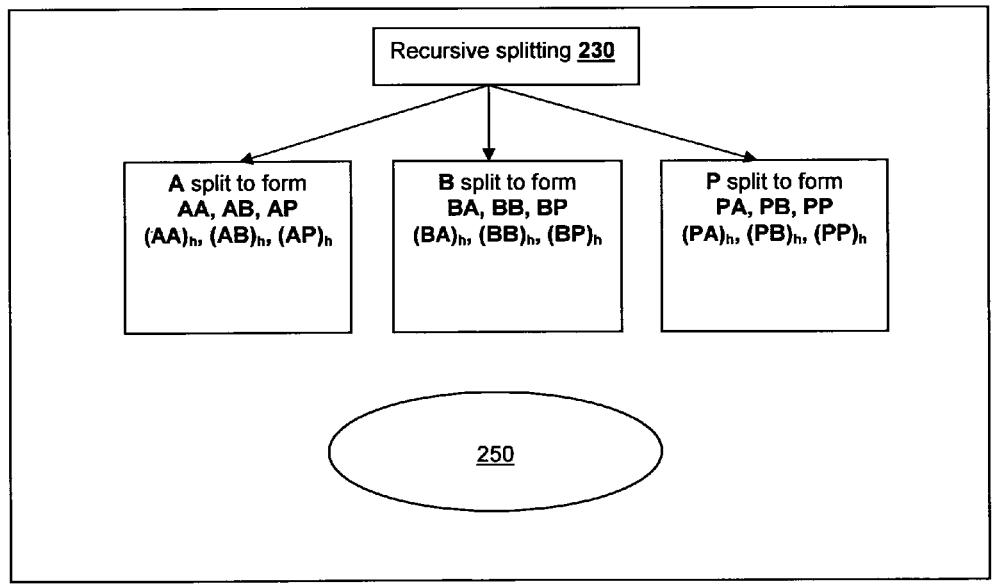

As shown in FIG. 3a, in the authentication embodiment, the hash codes are only required for the lowest level of data subsets and/or parity data AA, AB, AP, BA, BB, BP, PA, PB and PP as these are the only files that will be stored for later regeneration, i.e. they require authentication when they are read to ensure authenticity.

The various hash codes may be generated for the lowest level data sets in the cascade.

Figure 4:
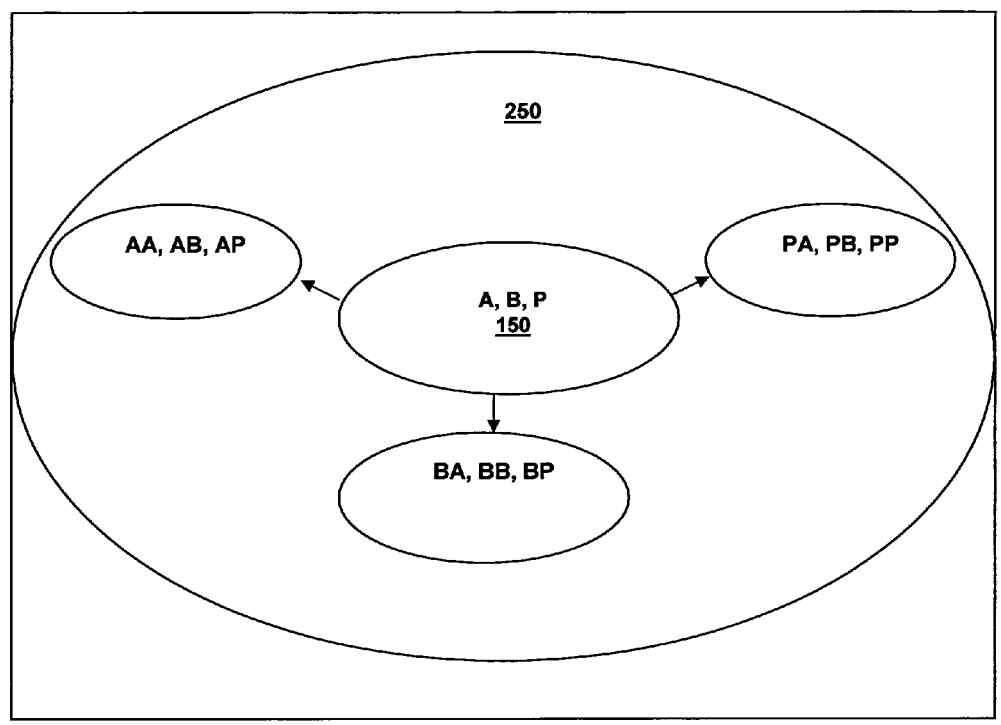
FIG. 4 shows a schematic diagram of the data distributed as clusters stored following the method of FIG. 1.
Figure 4A:
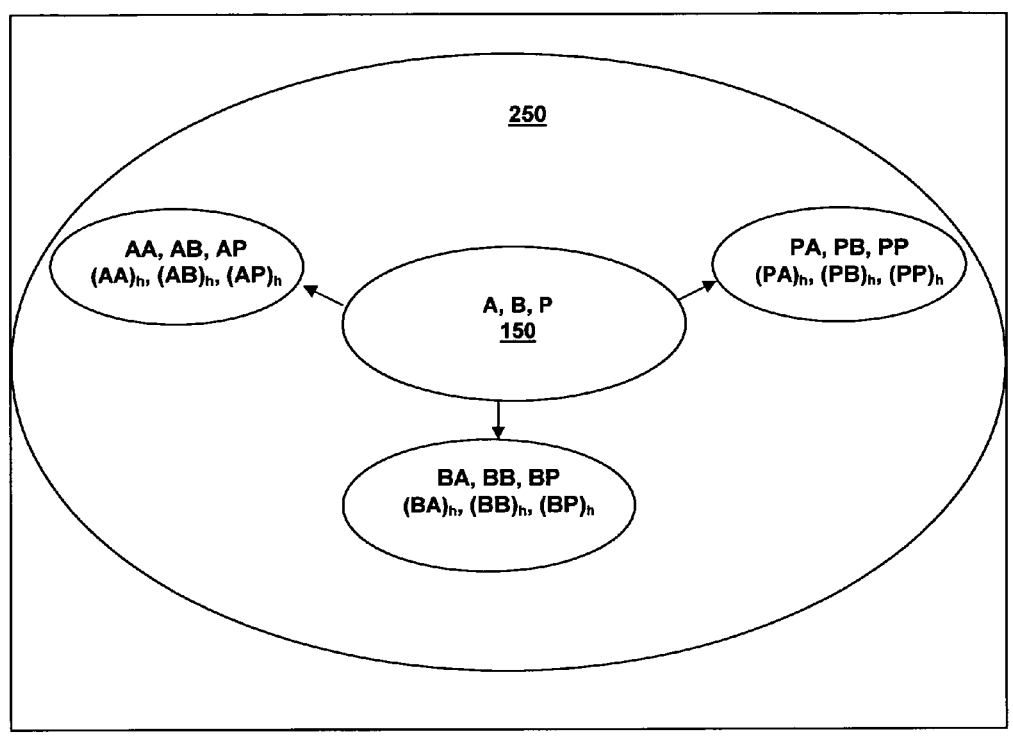

This additional recursive splitting 230 results in data subset A being split to form further data subsets AA and further parity data AP. Similarly, data subset B may be split into BA and BB, which together may be used to form parity data BP. Parity data P may be split into PA, PB and PP. For this particular embodiment of the method each of the three data subsets have the same size. The nine separate data locations used to store each of these nine data subsets may form a second level cluster 250, which is shown in more detail as FIG. 4 (see FIG. 4a for the authentication embodiment).

In other words, the first level cluster 150 has been expanded to form a second level cluster 250. There is therefore no need to store the original three data sets A, B and P (but this may be done anyway as an alternative method for additional resilience to data loss) as these may each be recreated from the nine data subsets in the second level cluster 250. The loop in the method 10 may be repeated as many times as necessary until all available storage locations are used or a predetermined limit is reached of the size of each subset has been reduced to a particular level.

FIG. 5 shows a schematic diagram of a system 300 used to store data according to the method 10 shown in FIG. 1. The system shown in FIG. 5 shows additional optional steps used to enhance the security and reliability of the system 300 according to the authentication embodiment. A central server 360 administers the method and receives a request from a user to enter the system 310. The user logs on and is provided with encryption keys 320. Furthermore, a set of hash-codes (which may be unique) may be generated at step 45, which serves as a unique identifier for the file, which may be used to guarantee authenticity. Encryption keys may be used to generate the hash codes. In this particular embodiment a file is being stored as data 20. A database 370 is used to store log-in information and encryption keys and also the name of files to be stored. The user registers with the database to create a file name at step 340 and the data file is split into subsets A and B and parity data P is created from these data subsets. Each of the data subsets and parity data are assigned an identifier at step 350, which is also administered by the database 370. Separate storage locations are accessible over a network and form a pool of available storage locations 380. The server 360 may determine the maximum level of recursive splitting to be achieved, which may be determined by predefined preferences or system parameters. The server 360 also monitors the availability of each individual separate storage location within the pool 380.

In this way, individual users may back-up particular files or their entire data storage system over any particular number of separate storage locations from an available pool 380. The server 360 may administer the storage as a processing layer invisible to the user. In other words, once they have accessed the system the storage of data appears to the user as conventional storage and retrieval. The original data 20 may be retrieved from the pool of storage locations 380 whilst any missing data may be regenerated using the parity data P. from any required data layer. The server 360 keeps track of the level of data cascading and each data subset. The server may also store and administer the hash codes, which may be stored separately or together with the data subsets and parity data.

Furthermore, the data subsets may be encrypted using the encryption keys and a tamper or distortion prevention facility may be incorporated using the hash-code. Therefore, the system 300 shown in FIG. 5 provides additional safety to the user storing sensitive information, as a third party having access to any or all of the individual separate storage locations within this storage pool 380 cannot recreate the original data 20 without the original encryption keys administered by the server 360. Alternatively, no encryption key may be required but there may be a prohibitive level of computing power needed to generate an altered data subset with the same hash code as the original. The encryption keys may also be used to encrypt the data subsets for added security. Intercepting the transfer of data subsets between the storage pool 380 and the user by a third party also does not result in any data becoming available to them without the encryption keys, or obtaining copies of at least a minimum number of data subsets.

Figure 6:
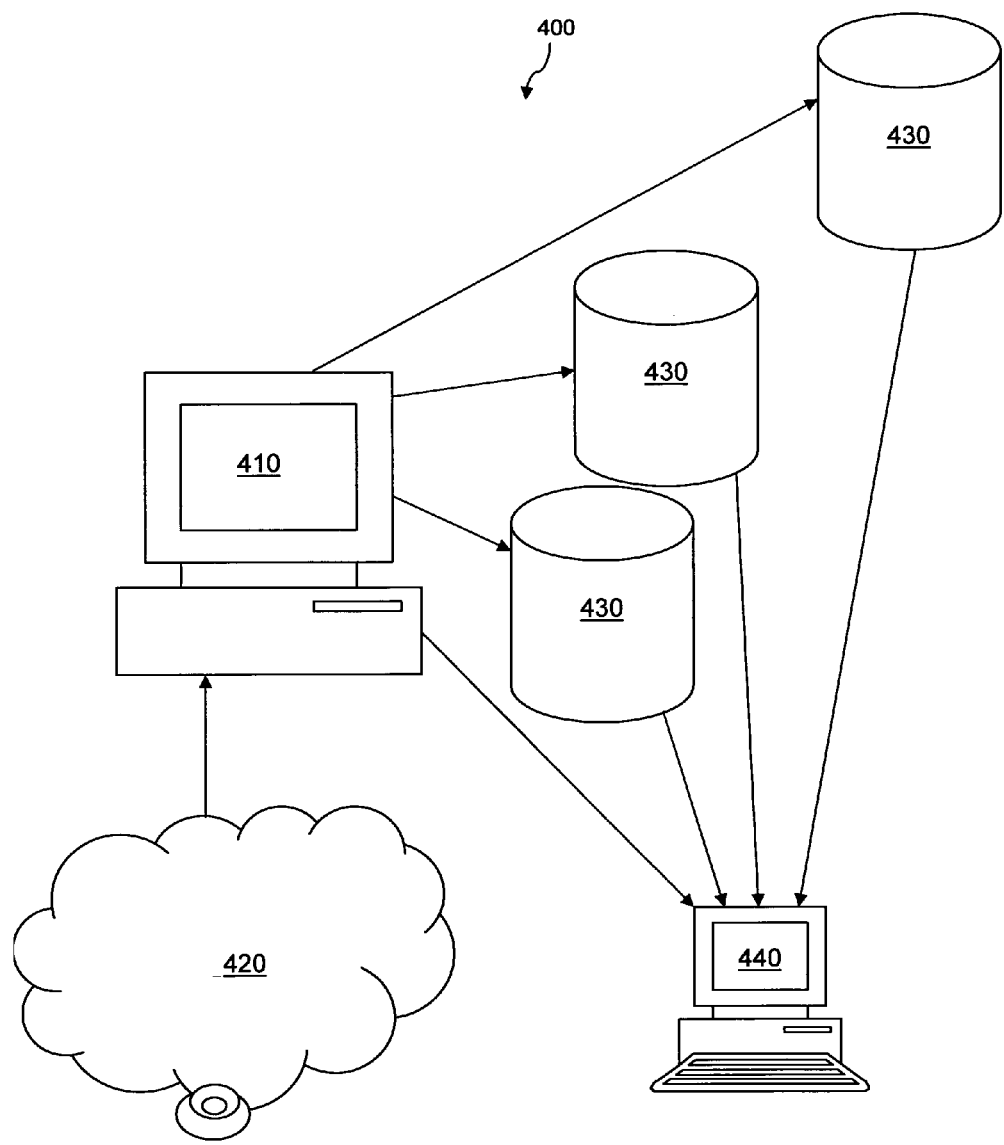
FIG. 6 shows a schematic diagram of a network used to store data according to a further aspect of the present invention

A further embodiment of a system used to perform the method 10 is shown in FIG. 6. The system 400 shown in FIG. 6 may be used to distribute information securely over networks such as the Internet or an intranet. The Internet or subsets of web pages 420 may be distributed securely to a user machine 440 via a central server 410. The central server 410 takes the web pages 420 and stores them according to the method 10 shown in FIG. 1 within separate storage locations 430. The data subsets may be encrypted and/or hashed to provide authentication, as described with reference to FIG. 5. Central server 410 supplies the user machine 440 with a decryption code or codes and information to identify and locate data subsets from particular storage locations 430 and how to recreate the data forming the original web pages 420. Therefore, the web pages 420 are no longer prone to a single point of failure or attack (for instance, a single web server going down) as the original data 20 is distributed amongst separate storage locations 430. Furthermore, any third party intercepting the network traffic of the user computer 440 would not be able to decrypt or recreate the original data forming the web pages 420 without the decryption keys and regeneration information supplied by the central server 410.

Alteration may be detected by rehashing the data subsets and/or parity data and comparing the resultant hash code with that associated with the original. Where a difference is detected this data subset or parity data may be rejected and recreated using only authenticated data sets and/or parity data. Only data subsets that fail authentication by the hash codes (or are otherwise lost or unavailable) need to be recreated or regenerated.

Such a secure system may be suitable for banking transactions or other forms of secure data or where the system user requires additional privacy and security.

The central server 410 may be able to store or cache the entire available Internet or any particular individual websites and make these available only to particular subscribing users. The central server 410 may also perform the function of a search engine or other central consolidator of information. Querying the search engine in this way may render search results containing decryption keys and information used to locate and regenerate the websites or other retrievable documents.

A further use for such a storage system according to the authentication embodiment, is to store and recreate high quality media avoiding distortion and missing data. For instance, higher quality audio or video recordings may be obtained due to the high level of error checking used. Each data subset may be checked for authenticity (e.g. corruption) using the authentication or hash codes. Any data subset that fails this authentication test may be rejected and regenerated using the parity data and any data subsets that pass authentication (the parity data may also be checked).

For instance this storage method may be implemented on hard drives, optical discs such as CDs, DVDs and Blueray® and file encoding similar to MP3 and MPEG type encoding. The method may be used to generate higher quality multimedia files.

Figure 7:
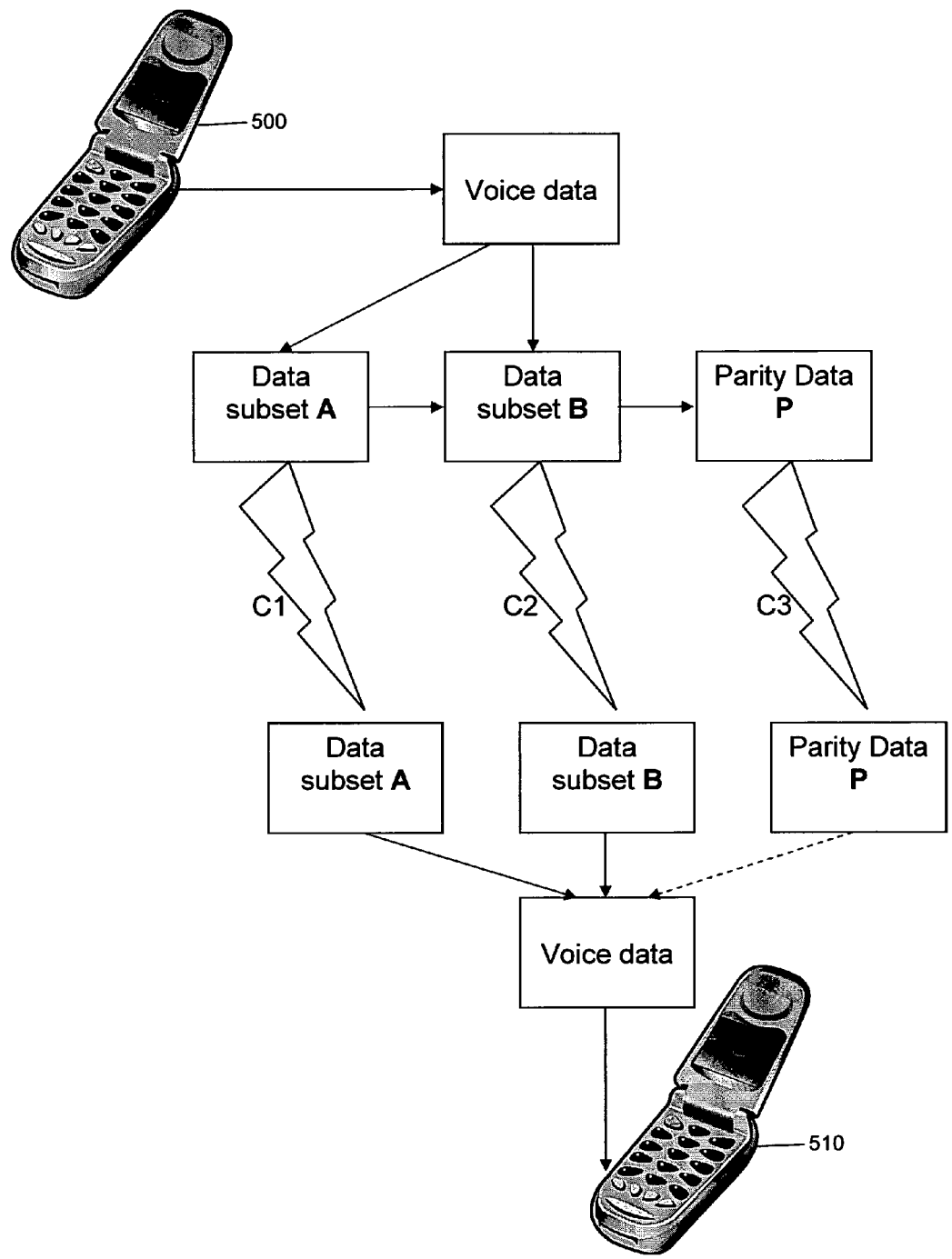
FIG. 7 shows a schematic diagram of a communication system according to a further aspect of the present invention, given by way of example only.

FIG. 7 shows a schematic diagram of a communication system. Two communication devices 500, 510 transmit and received data to and from each other. This may be via a communication network such as a cellular network or directly as in two-way radios. In the following example voice data is used as an illustration. However, many other types of data may also be transmitted and received such as for instance, video, web or Internet and data files.

As shown in FIG. 7, voice data is split into data subsets and parity data using a similar method to that described with respect to FIG. 1 for data storage. These data subsets A, B and parity data P are transmitted separately across individual channels C1, C2 and C3. These data sets may be transmitted according to other schemes together or separately and may be transmitted using different mediums, for instance a mixture of wireless, cable and fibre optic transmission. The splitting function may be carried out within the communication device 500 or within a transmission network facility such as a mobile base station or similar. A cellular telephone may be adapted by the additional of additional hardware to implement the described functions. Alternatively, the functions may be implemented as software.

As with the data storage embodiments, as an alternative authentication embodiment, hash codes may be generated from hash or other authentication functions and associated with the data subsets prior to transmission. This authentication embodiment is illustrated in FIG. 7a.

Data subsets A and B may be combined to form the original voice data as a reverse of the splitting procedure. If either subsets A or B are lost, missing from the received transmission or fail a hashing match test then parity data P may be used to regenerate the missing data in a similar way to the retrieval of stored data described above. An eavesdropper receiving only one of channels C1, C2 or C3 will therefore not be able to reconstruct the voice data. Therefore, this provides a more secure as well as more reliable communication system and method. Security may be enhanced further by differing the mode, type or frequency of each channel. Integrity may be provided by the hash function authentication checks in the authentication embodiment shown in FIG. 7a.

Figure 8:
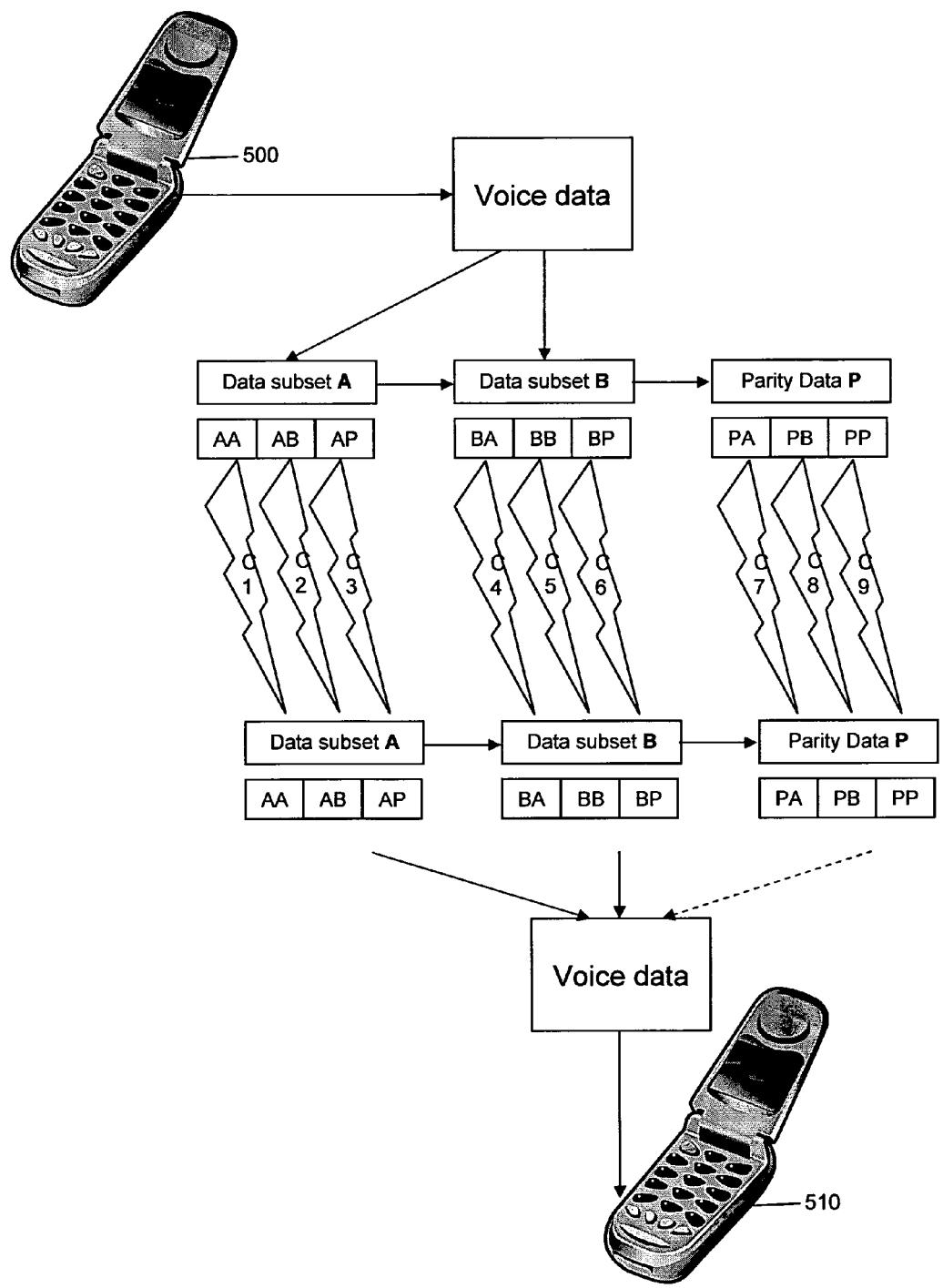
FIG. 8 shows a schematic diagram of a communication system according to a further aspect of the present invention, given by way of example only.

FIG. 8 shows a schematic diagram of a further embodiment similar to that shown in FIG. 7. However, this further embodiment implements a further cascade or layer of data splitting before transmission. A further level of recombination must be used to reconstruct the voice or other transmitted data. In the example shown in FIG. 8 this further cascade of data splitting and parity data generation requires nine channels to communicate each data subset and parity data. Such an additional cascade provides further resilience to data loss. The data transmitted from five of the channels may be lost with the data fully reconstructable (lossless). Further cascade may be achieved providing further resilience. Just as with the data storage example above, other numbers of channels of data may be used. For instance the data may be split three, four or five ways or more at each cascade. Further cascade levels may be implemented dependent on the required level of security or reliability. This further fills the available channel capacity but in so doing so reduces the power requirements of each channel to maintain the same probability of data loss (Shannon or noisy-channel coding theorem).

As shown in FIG. 8a, the transmitted data subsets and/or parity data (lowest levels in the cascade) may any or each have the hash function applied to them. The hash codes may be transmitted to the receiver.

The communication system may also comprise an additional layer of security or functionality. The communication device 510 receiving the data may require information as to which data subsets and parity data are transmitted over which particular channels. In the example shown in FIGS. 8 and 8a, channel C1 is used to transmit data subset AA, C2 is used for AB, etc, however, any combination may be used. Such information may be exchanged between communication devices 500, 510 before or during transmission, by for instance transmission of a code denoting a particular combination of channels and data subsets. The particular combination may vary during transmission and reception. This may be according to a prearranged or predetermined scheme or the particular current combination may be transmitted to keep the transmitter and receiver synchronised. Both communication devices 500, 510 may both transmit and receive simultaneously or in isolation.

As a further security precaution, the data may be stored or transmitted as difference or delta data relative to a reference file. Therefore, access to or knowledge of the reference file may be required in order to retrieve or receive the data.

This further security precaution may be used where there are practical or legal restrictions on transmitting or storing certain types or data. For instance, the storage of banking or confidential information may be restricted to a particular organisation or site. However, it may still be necessary to store these data such that the risk of their loss is reduced. Therefore, it may not be possible to distribute or transmit these types of data across different storage locations, as described previously, even using encryption. This problem may be addressed by instead transmitting and distributing the difference or delta data instead of the underlying data. In this situation, data protection requirements are met and the data may be secured against loss or corruption.

For example and as an illustration of this further alternative procedure, file A (or signal A) may be the underlying data required to be stored or transmitted. File B may be the reference file. A comparison of file A and file B may be made using a comparison function similar to UNIX diff, rdiff or rsync procedures to generate file C.

In a further alternative, the difference file may be generated by applying the XOR function to file A and file B, perhaps byte-wise, for example.

File C is therefore a representation or encoding of the difference between file A and file B; file A cannot be regenerated from file C without knowledge or access to file B. File B may take many different forms and may be a randomly generated string, a document, an audio file, a video file, the text of a book or any other known or generated data set, for example. The benefit of using a known data file (e.g. an MP3 file of a well known song) is that if the user's computer is lost, stolen or corrupted then the underlying data may be regenerated by acquiring a further copy of the known and publicly available reference file. The user must simply remember which particular file they used (perhaps a MP3 file of the user's favourite song). As there are millions of options to a user, security can remain relatively high even when a well-known data file is used.

In order to regenerate file A from file C, a function may be used to apply the difference or delta file C to the reference file B. Various methods may be used in for regenerating file A depending on how the difference or delta file C was generated and encoded. In the XOR example, a further XOR function may be applied to files C and B to regenerate file A. This may be done on a byte-by-byte basis, for example. It is likely that that files A and B will be of different sizes. Where file A is smaller than file B then the procedure may simply stop when each byte or file chunk has been compared. Where file A is larger than file B then multiple copies of file B may be used until each byte of file A has been compared. Other variations, difference procedures and comparison functions may be used.

Once the difference or delta file (or data stream) has been generated then this may be used as the original data described above and stored or transmitted (e.g. as voice data), accordingly. For the transmission and receiving embodiments, the difference data may be generated as a data stream, i.e. transmitted, received and encoded or decoded in real time. In other words, the difference data may be divided into data subsets with parity data generated so that these data subsets may be stored in a distributed way or transmitted according to the methods described above.

Where a data stream, in the form of difference data, is to be transmitted then the reference file (B) may again be used to sequentially encode the data stream in real-time. Should the data stream exceed the length of the reference file then the reference file may be reused until transmission ends. In voice communication, for example, each time transmission starts, the beginning of the reference file may be used for comparison with a digitised voice or audio data stream to generate the difference data stream. Alternatively, reuse may be reduced by continuing from the last point used in the reference file for each new transmission. This alternative may further improve security.

It should be noted that although separate embodiments have been described, features of these embodiments may be interchanged, especially regarding data manipulations. Furthermore, features described with respect to the transmission and reception embodiments may be used with the storage embodiments and visa versa.

As will be appreciated by the skilled person, details of the above embodiment may be varied without departing from the scope of the present invention, as defined by the appended claims.

For example, the data may be stored on many different types of storage medium such as hard disks, FLASH RAM, web servers, FTP servers and network file servers or a mixture of these. Although the files are described above as being split into two data subsets (A and B) and a single parity data block (P) during each iteration three (A, B and C), four (A-D) or more data subsets may be generated.

The parity data is described in the example as being generated from the XOR function but other functions may be used. For instance, Hamming, Reed-Solomon, Golay, Reed-Muller or other suitable error correcting codes may be used.

The data subsets maybe stored in physically separate or logically separate locations even within the same hard disk drive or cluster.

Many combinations, modifications, or alterations to the features of the above embodiments will be readily apparent to the skilled person and are intended to form part of the invention.

The invention claimed is:

1. A method of storing data, the method comprising:
provisioning a first level cluster by separating the data into a first plurality of data subsets, and generating parity data from the first plurality of data subsets such that each data subset of the first plurality of data subsets may be recreated from other subsets of the first plurality of data subsets and the data from the first plurality of data subsets;
subsequent to provisioning the first level cluster, provisioning a second level cluster by separating the first plurality of data subsets and the parity data from the first plurality of data subsets into a second plurality of data subsets comprising a greater number of data subsets than the first plurality of data subsets, and generating parity data from the second plurality of data subsets such that each data subset of the second plurality of data subsets may be recreated from other data subsets of the second plurality of data subsets and the parity data from the second plurality of data subsets; and subsequent to provisioning the second level cluster, storing each data subset of the second plurality of data subsets and the parity data from the second plurality of data subsets in separate storage locations that are remote from each other and accessed over an external network.

2. The method of claim 1, further comprising, subsequent to provisioning the second level cluster and before storing each data subset of the second plurality of data subsets and the parity data from the second plurality of data subsets:

separating the second plurality of data subsets and the parity data from the second plurality of data subsets into a third plurality of data subsets; and generating parity data from the third plurality of data subsets such that a data subset of the third plurality of data subsets may be recreated from other data subsets of the third plurality of data subsets and the parity data from the third plurality of data subsets.

3. The method of claim 1, further comprising:

providing additional storage locations that are physically separate and remote from each other, and accessed over an external network; and as the additional storage locations are provided:
separating one or more data subsets of the second plurality of data subsets into a plurality of additional data subsets;
generating parity data from the plurality of additional data subsets such that a data subset of the plurality of additional data subsets may be recreated from other data subsets of the plurality of additional data subsets and the parity data from the plurality of additional data subsets; and
storing each data subset of the plurality of additional data subsets and the parity data from the plurality of additional data subsets in the additional storage locations.

4. The method of claim 1, further comprising encrypting the data.

5. The method of claim 1, wherein the data comprises web pages.

6. The method of claim 1, further comprising:

applying a function to at least one of one or more data subsets of the second plurality of data subsets, or the parity data from the second plurality of data subsets, to generate one or more associated authentication codes.

7. The method of claim 6, wherein the function is a hash function.

8. The method of claim 6, further comprising storing an authentication code of the one or more associated authentication codes with at least one of a data subset of the second plurality of data subsets, or the parity data from the second plurality of data subsets, the authentication code of the one or more associated authentication codes being associated with the at least one of the data subset of the second plurality of data subsets, or the parity data from the second plurality of data subsets.

9. The method of claim 1, wherein generating the parity data from the first plurality of data subsets comprises performing an exclusive OR logical function on the first plurality of data subsets, or wherein generating the parity data from the second plurality of data subsets comprises performing an exclusive OR logical function on the second plurality of data subsets.

10. An apparatus for storing data, the apparatus comprising at least one processor configured to:

provision a first level cluster by separating the data into a first plurality of data subsets, and generating parity data from the first plurality of data subsets such that each data subset of the first plurality of data subsets may be recreated from other data subsets of the first plurality of data subsets and the parity data from the first plurality of data subsets;

subsequent to provisioning the first level cluster, provision a second level cluster by separating the first plurality of data subsets and the parity data from the first plurality of data subsets into a second plurality of data subsets comprising a greater number of data subsets than the first plurality of data subsets, and generating parity data from the second plurality of data subsets such that each data subset of the second plurality of data subsets may be recreated from other data subsets of the second plurality of data subsets and the parity data from the second plurality of data subsets; and subsequent to provisioning the second level cluster, store each data subset of the second plurality of data subsets and the parity data from the second plurality of data subsets in separate storage locations that are remote from each other and accessed over an external network.

11. The apparatus of claim 10, wherein the at least one processor is further configured to:

apply a function to at least one of one or more data subsets of the second plurality of data subsets, or the parity data from the second plurality of data subsets, to generate one or more associated authentication codes; and store the one or more data subsets of the second plurality of data subsets, or the parity data from the second plurality of data subsets, with their associated authentication codes.

* * * * *